United States Patent
Wang et al.

(10) Patent No.: US 9,520,035 B2
(45) Date of Patent: Dec. 13, 2016

(54) POINT OF SALE DEVICE

(71) Applicant: ENNOCONN CORPORATION, New Taipei (TW)

(72) Inventors: Kun-Ming Wang, New Taipei (TW); Shih-Chi Liu, New Taipei (TW)

(73) Assignee: ENNOCONN CORPORATION, New Taipei (TW)

( * ) Notice: Subject to any disclaimer, the term of this patent is extended or adjusted under 35 U.S.C. 154(b) by 0 days.

(21) Appl. No.: 14/525,997

(22) Filed: Oct. 28, 2014

(65) Prior Publication Data

US 2016/0005274 A1   Jan. 7, 2016

(30) Foreign Application Priority Data

Jul. 4, 2014 (TW) .............................. 103123082 A

(51) Int. Cl.
*G07G 1/00* (2006.01)
*G06F 1/18* (2006.01)
*G07G 1/12* (2006.01)
*G06F 1/16* (2006.01)

(52) U.S. Cl.
CPC ............... *G07G 1/0018* (2013.01); *G06F 1/16* (2013.01); *G06F 1/181* (2013.01); *G07G 1/12* (2013.01)

(58) Field of Classification Search
CPC ...... G07G 1/0018; G07G 1/12; G07G 1/1613; G06F 1/16; G06F 1/181; G06F 1/088; G06F 1/0886; H05K 7/02; H05K 5/00
USPC .......... 361/679.01, 679.02, 679.09, 361/679.21–679.23, 679.27, 679.41, 361/679.44, 679.58; 235/379, 381, 382.5, 235/383, 462.12, 235/462.3; 174/520, 174/527, 535, 549; 312/223.2
See application file for complete search history.

(56) References Cited

U.S. PATENT DOCUMENTS

| | | | | |
|---|---|---|---|---|
| 4,881,606 A | * | 11/1989 | Halfon | G01G 21/06 177/126 |
| 5,927,878 A | * | 7/1999 | Kasai | G06F 1/16 400/691 |
| 6,003,008 A | * | 12/1999 | Postrel | G06F 1/183 235/381 |
| 6,062,478 A | * | 5/2000 | Izaguirre | G06F 1/16 235/462.43 |
| 7,472,825 B2 | * | 1/2009 | Fitch | G07G 1/0018 235/379 |
| 8,550,343 B2 | * | 10/2013 | Ko | G07F 7/0886 235/383 |
| 8,897,003 B2 | * | 11/2014 | Ishii | G06F 1/181 174/520 |
| 2006/0258206 A1 | * | 11/2006 | Lam | G06F 1/181 439/521 |
| 2007/0038517 A1 | * | 2/2007 | Lin | G07G 1/0018 705/17 |
| 2012/0287594 A1 | * | 11/2012 | Ko | G07G 1/12 361/809 |
| 2013/0194736 A1 | * | 8/2013 | Ishii | G06F 1/181 361/679.02 |
| 2013/0198017 A1 | * | 8/2013 | Minegishi | G06F 1/1613 705/16 |
| 2015/0149311 A1 | * | 5/2015 | Ward | G07G 1/0018 705/24 |

FOREIGN PATENT DOCUMENTS

| | | |
|---|---|---|
| CN | 201562309 U | 8/2010 |
| TW | 201131335 A | 9/2011 |
| TW | 201325922 A | 7/2013 |

* cited by examiner

*Primary Examiner* — Michail V Datskovskiy
(74) *Attorney, Agent, or Firm* — Zhigang Ma

(57) ABSTRACT

A point of sale device includes a base defining an opening in a top thereof and a through hole in a bottom thereof, a motherboard mounted in the base and comprising a plurality of sockets exposed in the opening to engage with a plurality of cables, and a top cover pivotably attached to the base to shield the opening. The cables extend through the through hole.

9 Claims, 4 Drawing Sheets

POINT OF SALE DEVICE

FIELD

The subject matter herein generally relates to a point of sale (POS) device.

BACKGROUND

Sockets on a motherboard of a POS device are usually disposed downward.

BRIEF DESCRIPTION OF THE DRAWINGS

Implementations of the present technology will now be described, by way of example only, with reference to the attached figures.

DETAILED DESCRIPTION

Figure 1:
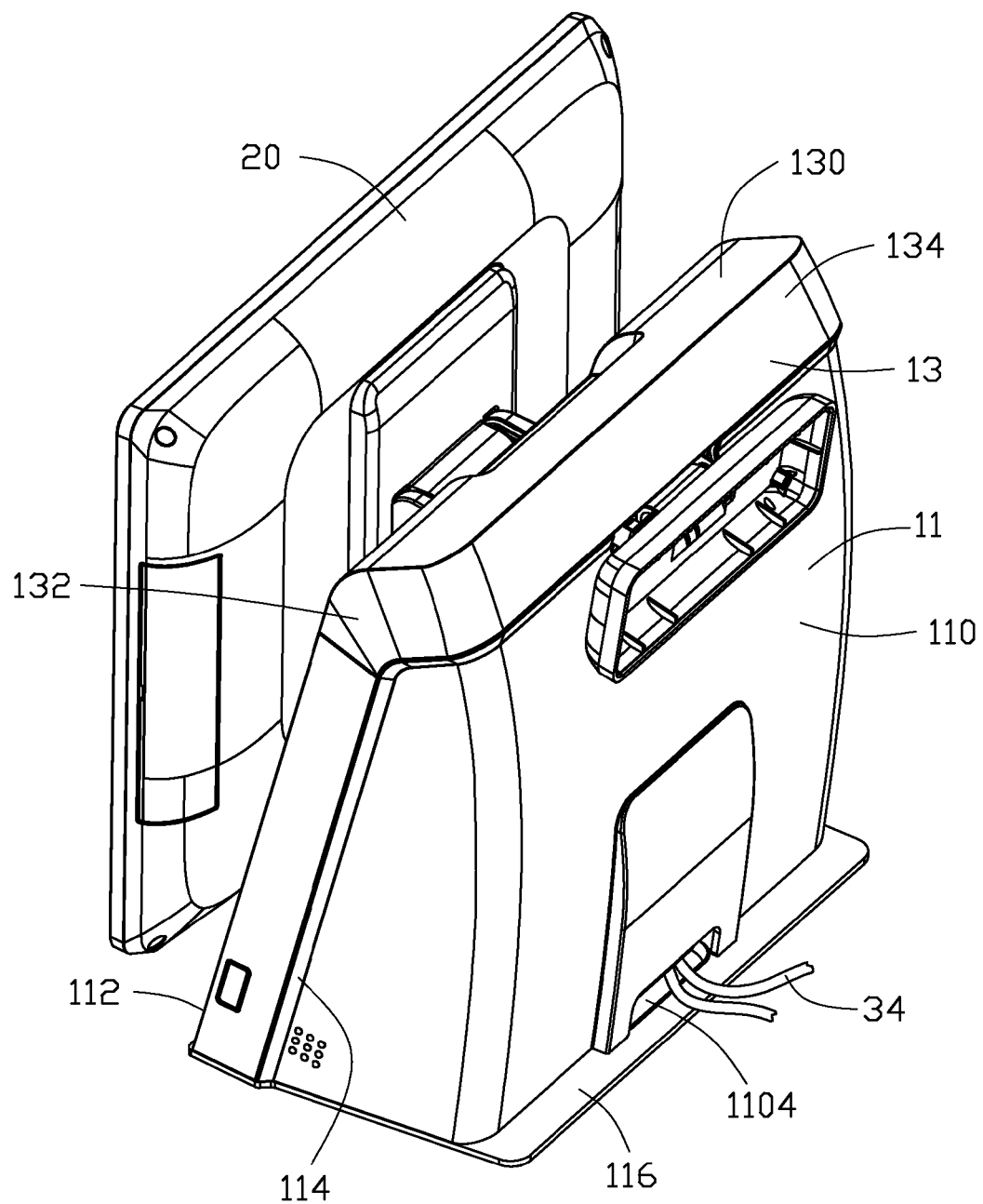
FIG. 1 is an assembled, isometric view of an embodiment of a POS device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other feature that the term modifies, such that the component need not be exact. For example, "substantially cylindrical" means that the object resembles a cylinder, but can have one or more deviations from a true cylinder. The term "inside" indicates that at least a portion of a region is partially contained within a boundary formed by the object. The term "comprising" means "including, but not necessarily limited to"; it specifically indicates open-ended inclusion or membership in a so-described combination, group, series and the like.

The present disclosure describes a point of sale (POS) device.

Figure 2:
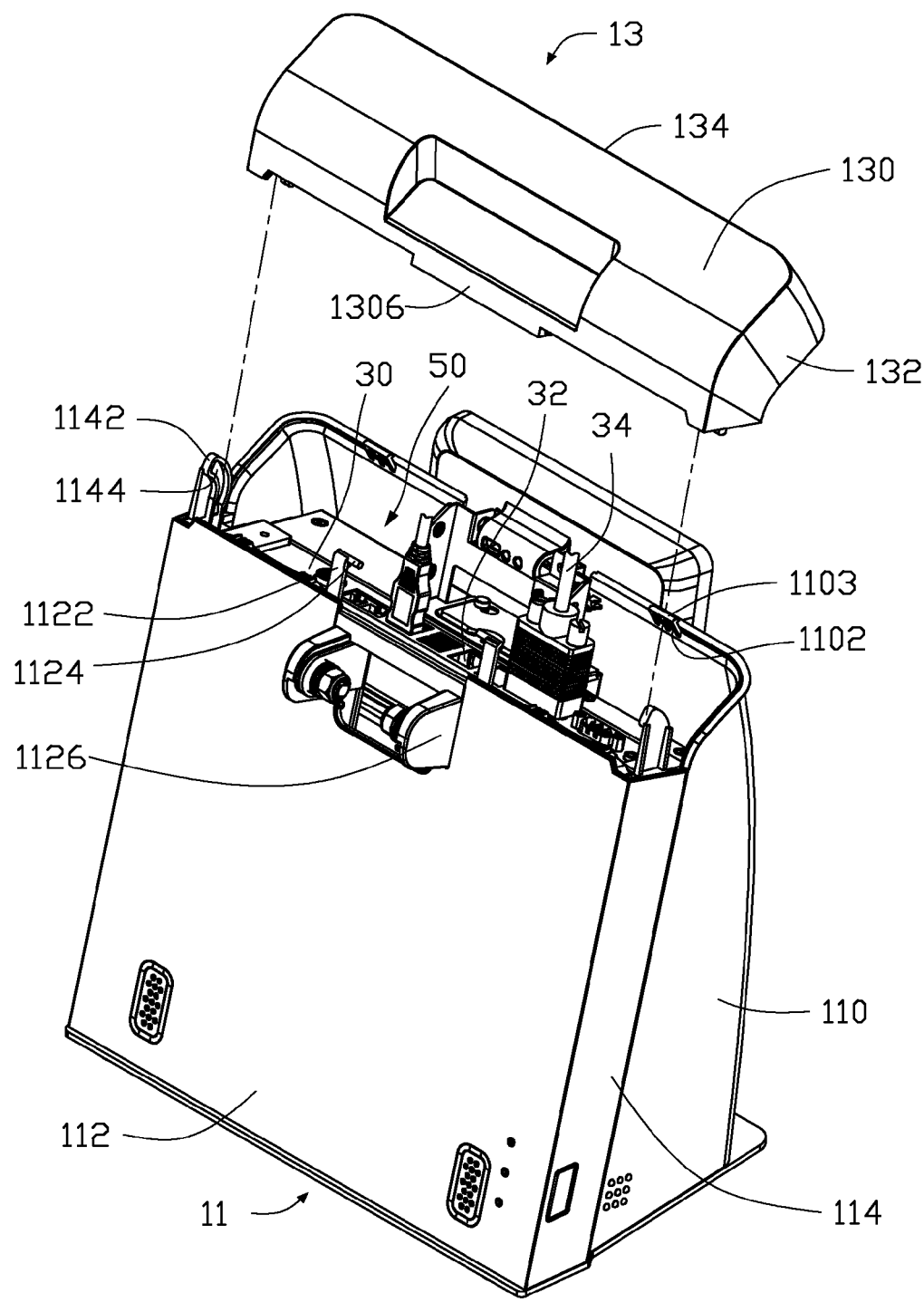
FIG. 2 is an exploded, isometric view of FIG. 1.

FIGS. 1 and 2 illustrate that an embodiment of the POS device can comprise a base 11, a top cover 13 pivoted to a top of the base 11, a display 20 mounted to the base 11 and a motherboard 30 mounted to the base 11.

Figure 4:
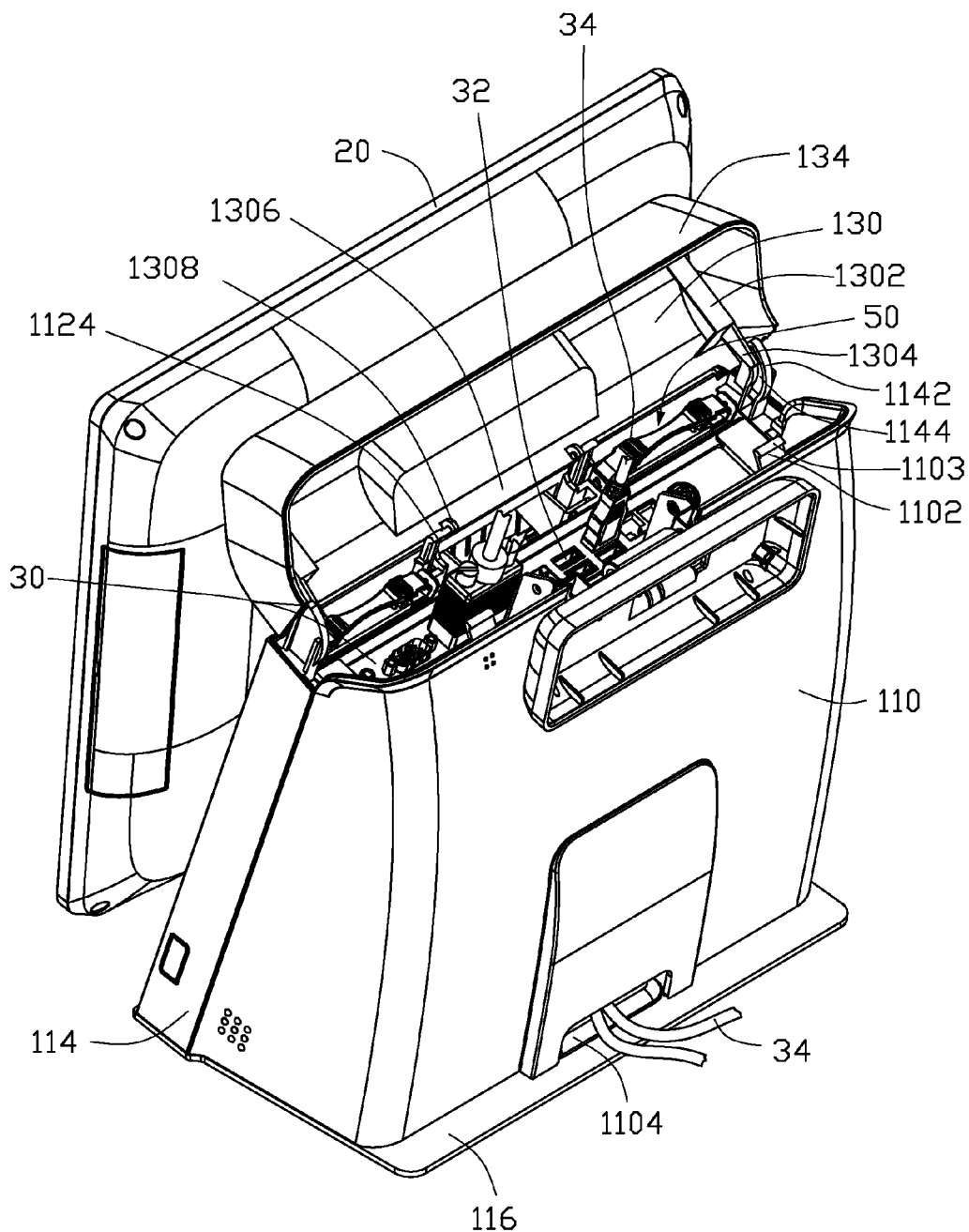
FIG. 4 is an isometric view of FIG. 1, wherein an opening is open.

FIGS. 2 and 4 illustrate that the base 11 can comprise a first side plate 110, a second side plate 112 relative to the first side plate 110, two end plates 114 coupled between side edges of the first side plate 110 and the second side plate 112, and a bottom plate 116 coupled with bottom edges of the first side plate 110, the second side plate 112 and the two end plates 114. An opening 50 is defined in the top of the base 11. Two hooks 1102 extend up from an inside of a top of the first side plate 110. A hooking portion 1103 extends from a distal end of each hook 1102. A through hole 1104 is defined in a bottom of the first side plate 110. Two fixing members 1122 extend from an inside of a top of the second side plate 112. Two shafts 1124 extend from two distal ends of the two fixing members 1122, respectively. A connecting member 1126 extends from an outside of the second side plate 112, near the two fixing members 1122. A rail 1142 extends up from an inside of a top of each end plate 114. Two slots 1144 extend from two sides of the two rails 1142 relatively. Each slot 1144 is substantially arcuate.

Figure 3:
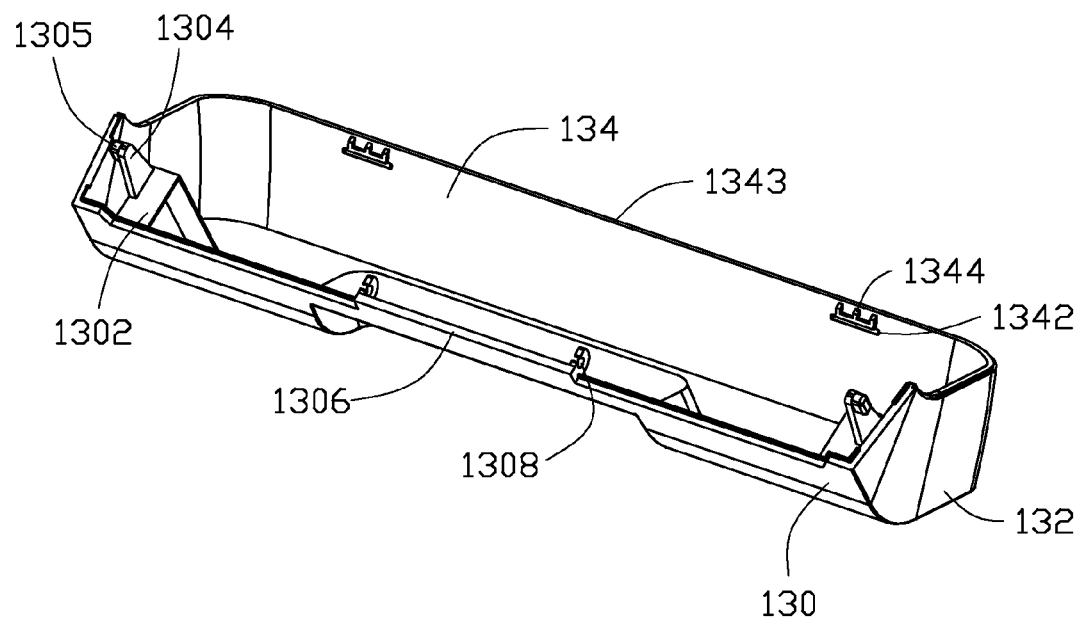
FIG. 3 is an isometric view of a top cover of FIG. 1, but viewed from another angle.

FIG. 3 illustrates that the top cover 13 can comprise a first cover plate 130, two connecting plates 132 extending from two opposite ends of the first cover plate 130, and a second cover plate 134 extending from a side of the first cover plate 130 and coupled between the two connecting plates 132. Two supporting members 1302 extend from two insides of two opposite ends of the first cover plate 130. An arm 1304 extends from each supporting member 1302. Two sliding blocks 1305 oppositely extend from two distal ends of the two arms 1304. A protruding bar 1306 extends from a side away from the second cover plate 134 of the first cover plate 130. Two C-shaped hooking pieces 1308 extend from two opposite ends of the protruding bar 1306. Two grooves 1342 are defined in an inside of a side away from the first cover plate 130 of the second cover plate 134. A substantially E-shaped blocking bar 1344 is disposed between an outer side edge 1343 of the second cover plate 134 and each groove 1342, near the corresponding groove 1342.

In assembly, the two hooking pieces 1308 pivotally engage with the two shafts 1124 of the second side plate 112, and the two sliding blocks 1305 of the first cover plate 130 slide and engage in the two slots 1144 of the rails 1142 to allow the top cover 13 to be pivoted on the base 11.

The motherboard 30 is mounted on the base 11 and comprises a plurality of sockets 32 exposed in the opening 50. A plurality of cables 34 is coupled with the sockets 32 of the motherboard 30 and extends through the through hole 1104.

The top cover 13 is pivoted relative to the base 11 to shield the opening 50 of the base 11. The two hooking portions 1103 of the two hooks 1102 engage in the two grooves 1342 of the second cover plate 134 and are blocked by the two blocking bars 1344 to engage with the second cover plate 134.

The display 20 is pivoted to the connecting member 1126 of the second side plate 112.

To couple or detach the cables 32 to or from the sockets 32 of the motherboard 30, the two hooks 1102 deform and are released from the two grooves 1342, and the top cover 13 is pivoted relative to the base 11.

The embodiments shown and described above are only examples. Many details are often found in the art such as the other features of a point of sale device. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A point of sale device comprising:
    a base defining an opening in a top of the base and a through hole in a bottom of the base;
    a motherboard mounted in the base and comprising a plurality of sockets exposed in the opening to engage with a plurality of cables, the cables extending in the base and through the through hole; and
    a top cover pivotably attached to the base to shield the opening.

2. The point of sale device of claim 1, wherein the top cover comprises a first cover plate and a second cover plate extending from a side of the first cover plate, the base comprises a first side plate and a second side plate opposite to the first side plate, the first cover plate is pivotably attached to a top of the second side plate, the second cover plate is hooked with a top of the first side plate.

3. The point of sale device of claim 2, wherein two hooking pieces extend from the first side plate, two fixing members extend from a top of the second side plate and a shaft extends from each fixing member, the two hooking pieces pivotally hooking the shafts.

4. The point of sale device of claim 2, wherein two arms extend from the top cover and a sliding block extends from each arm, two rails extend from a top of the second side plate and an arcuate slot defined in each rail, the two sliding blocks respectively sliding in the two slots.

5. The point of sale device of claim 4, wherein two supporting members extend from insides of two opposite ends of the first cover plate to support the two arms.

6. The point of sale device of claim 2, wherein two grooves are defined in the second cover plate, two hooks extend from a top of the first side plate and a hooking portion extends from an end away from the first side plate of each hook, two hooks extend through the grooves to allow the two hooking portions to engage with the second cover plate.

7. The point of sale device of claim 6, wherein two blocking bars extend from the second cover plate, near the two grooves to block the hooking portions.

8. The point of sale device of claim 2, wherein the through hole is defined in a bottom of the first side plate of the base.

9. The point of sale device of claim 1, wherein the through hole is defined in a bottom of a first side plate of the base.

* * * * *